No. 866,788. PATENTED SEPT. 24, 1907.
J. L. HOLSTEIN.
COLLET ATTACHMENT.
APPLICATION FILED OCT. 8, 1906.
2 SHEETS—SHEET 1.
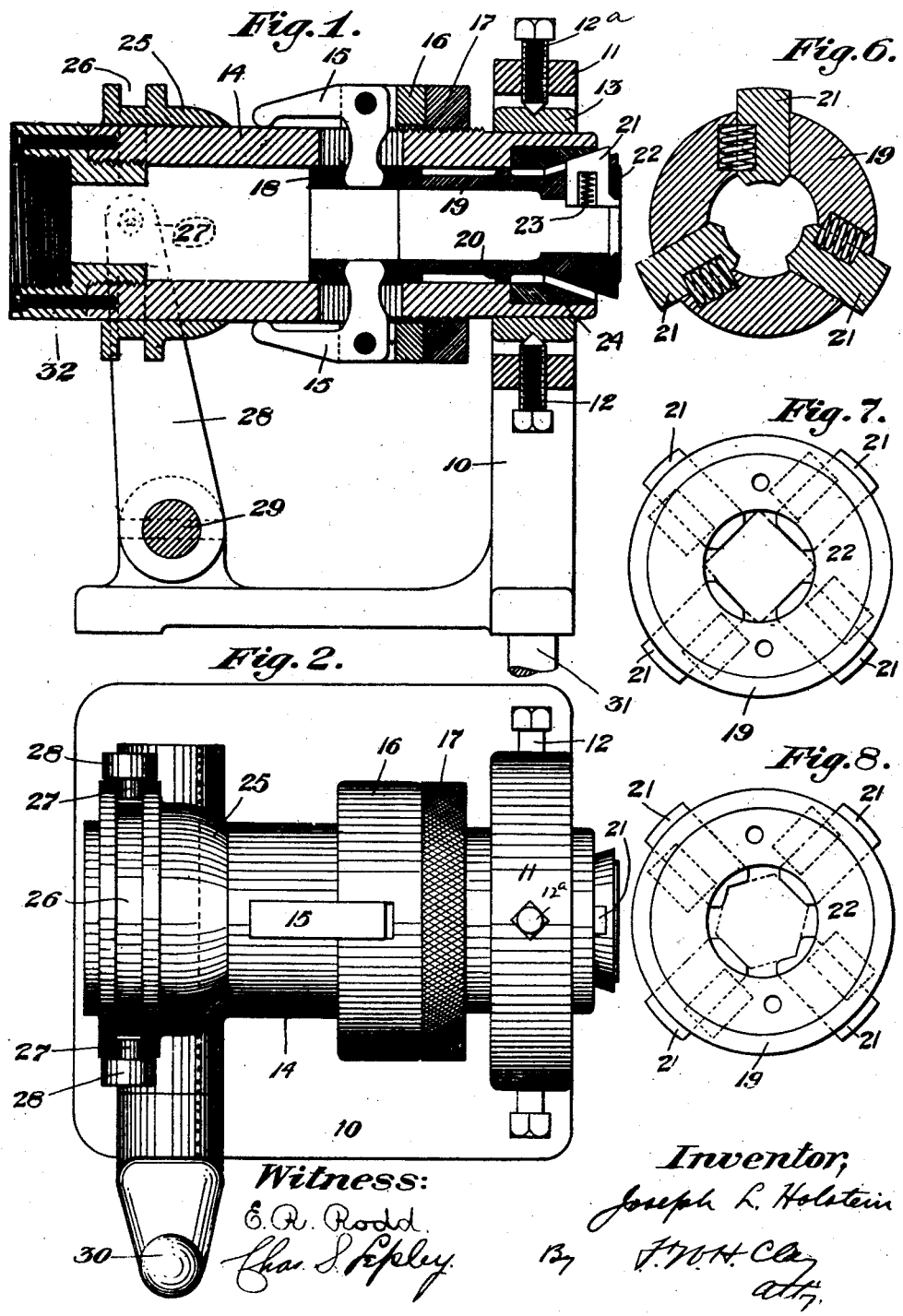

No. 866,788. PATENTED SEPT. 24, 1907.
J. L. HOLSTEIN.
COLLET ATTACHMENT.
APPLICATION FILED OCT. 8, 1906.

2 SHEETS—SHEET 2.

Witness:
E. R. Rodd.
Chas. S. Sipley

Inventor;
Joseph L. Holstein
By J.W.H. Clay
atty.

UNITED STATES PATENT OFFICE.

JOSEPH L. HOLSTEIN, OF CLEVELAND, OHIO, ASSIGNOR TO THE ADJUSTABLE COLLET COMPANY, OF CLEVELAND, OHIO, A CORPORATION.

COLLET ATTACHMENT.

No. 866,788.         Specification of Letters Patent.         Patented Sept. 24, 1907.

Application filed October 8, 1906. Serial No. 337,906.

*To all whom it may concern:*

Be it known that I, JOSEPH L. HOLSTEIN, a citizen of the United States, residing at Cleveland, in the State of Ohio, have invented certain new and useful Improvements in Collet Attachments, of which the following is a specification.

My invention relates to machines of the general type of a turning lathe or commonly called collet machine, and its primary object is to provide means for converting any machine with a bed plate and rotating spindle into a collet machine.

Other objects are to provide an easily adjustable collet attachment which can be put on and removed instantly, and to provide certain improvements in the construction of self adjusting collets.

These objects and other advantages to appear hereinafter are attained by the construction illustrated in one form in the accompanying drawings wherein,—

Figure 3:
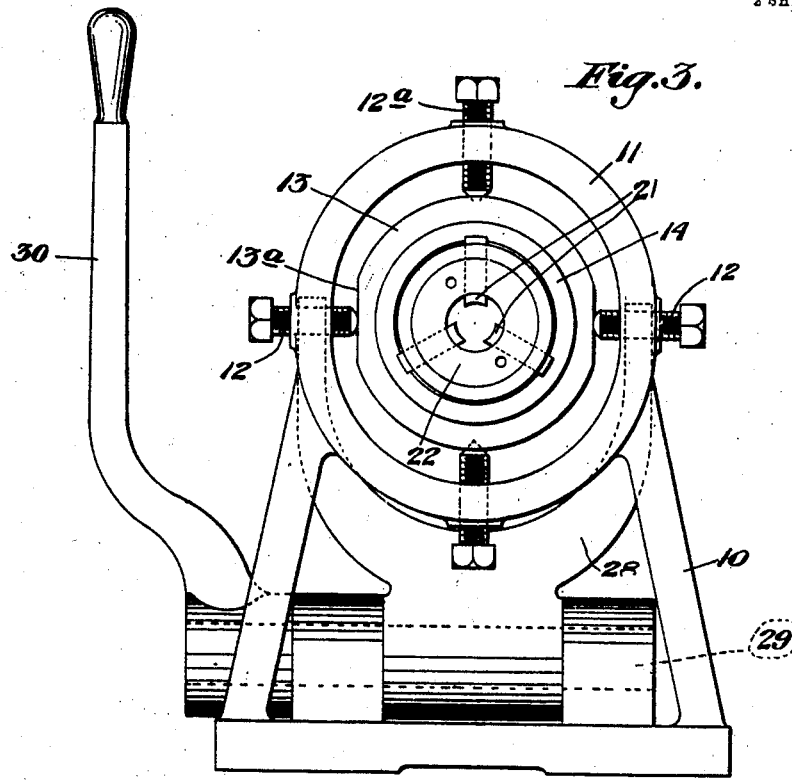
Figure 4:
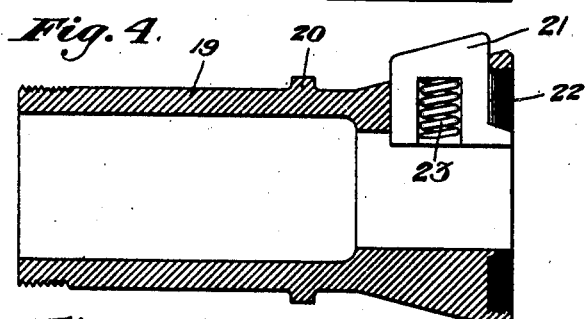
Figure 5:
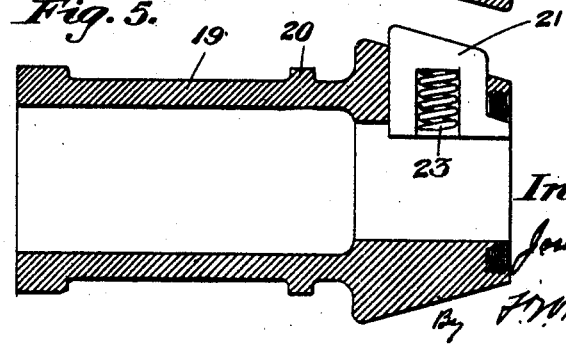

Figure 1 is a vertical central section of the principal parts of my collet attachment, with the support in side elevation. Fig. 2 is a top plan view of the same. Fig. 3 is a front elevation of the attachment. Figs. 4 and 5 are sections of the collet shown separately, in two forms, respectively a pull collet and push collet. Figs. 6, 7 and 8 are front views of several arrangements of the collet jaws for accommodating different shaped stock rods.

Ordinarily collet machines are especially designed, and the collet operating means are a permanent part of the machine so that the machine can be used for nothing else but working stock adapted to a collet; and the collets are made with solid jaws and a set of them are required in order to accommodate more than one size of stock. Again it is customary to work the collet from the rear end of the machine, and the bearings are the ordinary bearings of the spindle at considerable distance from the collet, often requiring a separate centering rest where the article is of any length. In order to convert any machine, such as a lathe, into a collet machine, I provide a portable attachment adapted to readily fit any machine having a rotating spindle.

In the drawings it will be seen that I have provided a frame 10 which carries a centering head ring 11 provided with adjusting screws 12 within which is placed a bearing ring 13. In this bearing ring is a hollow spindle 14 which is adapted to screw upon the end of a live spindle as shown at the left of Fig. 1. The spindle 14 is provided with a pair of oppositely disposed slots into which extend bell crank levers 15 pivoted upon an adjustable ring 16 sliding upon the spindle 14. A supplemental screw ring 17 is provided in order to lock the ring 16 in place so that the position of the bell crank levers 15 may be adjusted and fixed at any distance from the front end of spindle 14. Inside the spindle 14 is provided an actuating ring 18 to which is attached the collet 19 having gripping jaws. The collet has a bearing rib 20. The gripping jaws shown at 21 are made in the form of pins set in slots and held in place by a screw ring 22, so that they work in a radial direction. These gripping jaws are normally held outwardly by springs 23 and it will be observed that they have tapered outer faces which engage a tapered bearing ring 24 set in the front of the spindle 14. In order to work the collet jaws by means of the bell crank levers 15 there is the usual sliding wedge ring 25 in the peripheral slot 26 of which operate the pins 27 provided on the end of arms 28, the arms 28 being reciprocated when desired by means of the fixed shaft 29 and handle 30 arranged either as shown or horizontally in the usual manner.

The entire collet attachment is easily attached to or removed from any spindle by means of a proper collar 32 and to the lathe bed by means of bolts 31 as will be apparent, and the adjustment of the collet in line with the machine spindle is readily made by means of the screws 12 12$^a$, of which the former are arranged to slide on the flat surface 13$^a$ (Fig. 3). The collet 19 may, of course, be arranged for a pull collet as shown in Fig. 4 or as a push collet as shown in Fig. 5, by merely reversing the direction of slope of the bearing surfaces on the clamping jaws 21. These clamping jaws may of course be provided in any number desired and given the various forms shown in Figs. 6, 7 and 8 in order to operate upon any shape of stock as desired.

It will be seen that by the above described structure the collet attachment may instantly be applied to the live spindle of a standard lathe or other similar spindle and the centering of the collet is readily made, and that the operation is that when the lever 30 is moved to cause the wedge ring 25 to come under the bell crank levers 15, these latter act to draw the collet 19 within the conical ring 24 which latter thereupon engages the outer ends of the gripping jaws 22 and thrusts them down in a radial direction upon the stock. The centering of the collet being accomplished by the rib 20, the contact of the gripping jaws with the ring 24 is not depended upon to center the gripping jaws and therefore they are self adjusting so that they will allow for any irregularity in the stock. It will also be seen that the thrust upon the gripping jaw is direct in a radial direction and that the play of the jaw depends merely upon the distance it moves within the sloping ring 24. It is also evident that by providing several sets of the simple pins 21 with one of these attachments the collet can be instantly changed to fit different sizes of stock by removing the holding ring 22 and sliding the pins 21 out of the slot in a forward direction. The springs 23 are set to one side of the pin 21 as will be apparent, in order to avoid weakening the pin and also to conveniently hold the spring in its place in the collet head.

It will be recognized that it is a great advantage to be able to steady and center the collet at its extreme end by means of the ring 13 and the rib 20 and that by means of the screw ring 16 and the lock ring 17 the throw of the collet jaws can be securely and instantly adjusted. Inasmuch as the only wearing bearings in the collet are on the pins 21 they alone will need to be hardened and this very much increases the life of the collet. The collet can be made to draw or push by simply changing the ring 24 and reversing the position of the bell crank levers 15, while the whole attachment being placed on the front of the machine renders it far more convenient than heretofore.

A particular part of my invention is the self adjusted automatic collet itself with its interchangeable jaws, and the ease with which they may be ground to exactly fit the bearing ring 24, whatever may be the length of the jaw pins.

It is to be noted that the collet may be adjusted in the amount of throw of the jaws or the jaws may be interchanged without removing it from the machine. Other advantages will readily occur to those familiar with such machinery.

Having thus described my invention and illustrated its use, what I claim as new and desire to secure by Letters Patent, is the following:

1. In a universal collet attachment the combination of a portable frame, a hollow spindle mounted in the frame, means for connecting the rear end of the spindle to a live spindle and the frame to a lathe bed, a chuck in the front end of said hollow spindle, and means in the frame to adjust and center the alinement of the front end of the spindle.

2. The combination with a portable collet frame and means thereon to attach it to a lathe bed and to adjust the alinement of a collet therein, of a hollow spindle mounted in the frame, a collet with gripping jaws mounted in the spindle, and means on the spindle to operate the gripping jaws of the collet, substantially as described.

3. A collet attachment comprising a frame, a bearing ring therein adjustable transversely of its axis in all directions, a hollow spindle in the ring, a collet in the spindle having radially slidable gripping jaws, and means for moving the collet longitudinally of the spindle and connections between the spindle and the jaws by which such movement of the collet moves the jaws radially.

4. The combination with a revoluble shaft having a conical bearing surface therein, of a slotted collet head, means to center it in said shaft, a series of gripping jaws mounted to slide radially in the slots in said head, means to hold said jaws removably in the head.

5. In a collet the combination with a hollow shaft with a conical mouth, of a head 19 provided with longitudinal slots, a series of blocks 21 slidably mounted in the slots to engage the said conical shaft mouth, and a retaining means to hold the blocks in the slots, the collet head being provided with a separate centering and bearing rib 20, substantially as described.

6. The combination with a conical mouthed tubular spindle, of a collet head mounted therein having radially sliding blocks for gripping, means to move the collet head in the conical spindle to operate said jaws, and means to adjust the initial position of the collet head in the spindle to regulate the radial capacity of said jaws, substantially as set forth.

7. The combination with a conical bearing sleeve therefor, of a collet head comprising a hollow shaft with a slotted conical end, said slots opening to the end of the collet head, radially sliding blocks in the slots of the head and means for removably holding the blocks in the head, including a removable holding device closing the ends of the slots in the collet, whereby the blocks may be removed without removing the head from the said sleeve, substantially as described.

8. The combination of a portable frame having means to attach it to a lathe bed, a rotatable hollow spindle mounted therein having means to attach it to a lathe spindle, chuck-jaws in said rotatable spindle, means to operate them and an adjustable supporting ring in said frame for alining said hollow spindle.

9. As an article of manufacture a collet head comprising a hollow spindle having a bearing rib thereon, slots in the end of the spindle, radially operating jaws in said slots and a removable screw ring adapted to retain the jaws in the slots, substantially as described.

10. In a collet attachment the combination of a bearing cone, a hollow spindle slidable in said cone and having radially movable jaws engaging the cone, and means independent of said jaws to center the hollow spindle within the bearing cone.

In testimony whereof I have hereunto signed my name in the presence of the two subscribed witnesses.

JOSEPH L. HOLSTEIN.

In presence of—
JULIUS SPITZ,
AARON HAHN.